United States Patent
Clark

(10) Patent No.: US 11,492,143 B2
(45) Date of Patent: Nov. 8, 2022

(54) MULTI-ORBITAL TRANSFER VEHICLE CONSTELLATION AND METHOD OF USE

(71) Applicant: Atomos Nuclear and Space Corporation, Denver, CO (US)

(72) Inventor: Vanessa Jane Clark, Denver, CO (US)

(73) Assignee: Atomos Nuclear and Space Corporation, Denver, CO (US)

( * ) Notice: Subject to any disclaimer, the term of this patent is extended or adjusted under 35 U.S.C. 154(b) by 382 days.

(21) Appl. No.: 16/986,517

(22) Filed: Aug. 6, 2020

(65) Prior Publication Data

US 2021/0300597 A1 Sep. 30, 2021

Related U.S. Application Data

(60) Provisional application No. 62/886,867, filed on Aug. 14, 2019, provisional application No. 62/884,604, filed on Aug. 8, 2019.

(51) Int. Cl.
*B64G 1/64* (2006.01)
*B64G 1/10* (2006.01)
*B64G 1/24* (2006.01)

(52) U.S. Cl.
CPC ......... *B64G 1/1085* (2013.01); *B64G 1/1078* (2013.01); *B64G 1/242* (2013.01); *B64G 1/646* (2013.01)

(58) Field of Classification Search
CPC .............................. B64G 1/1078; B64G 1/646
See application file for complete search history.

(56) References Cited

U.S. PATENT DOCUMENTS

| | | | |
|---|---|---|---|
| 4,078,747 A | 3/1978 | Minovitch | |
| 4,187,506 A | 2/1980 | Frosch | |
| 5,282,357 A | 2/1994 | Sackheim | |
| 5,685,505 A | 11/1997 | Meckler | |
| 6,135,393 A | 10/2000 | Sackheim | |
| 6,364,252 B1* | 4/2002 | Anderman | B64G 1/007 244/158.6 |
| 6,543,723 B1* | 4/2003 | Oh | B64G 1/007 244/171.5 |
| 6,843,446 B2* | 1/2005 | Scott | B64G 1/244 244/10 |
| 7,624,950 B2 | 12/2009 | D'ausilio | |
| 9,038,957 B1 | 5/2015 | Fork | |

(Continued)

FOREIGN PATENT DOCUMENTS

| | | |
|---|---|---|
| CA | 2831309 | 6/2014 |
| EP | 2740668 | 6/2014 |

OTHER PUBLICATIONS

Pappalardo, Joe, How does the International Space Station dodge space junk?, Air & Space Magazine, (2007) pp. 1-2.

(Continued)

*Primary Examiner* — Brian M O'Hara
(74) *Attorney, Agent, or Firm* — Soumei Consulting, Inc.

(57) ABSTRACT

A modular and scalable system to transfer space articles between space orbits. In one embodiment, the system employs a rendezvous vehicle which docks with a space article in an initial orbit, the connected stack then docking with a locomotive vehicle which maneuvers to a targeted orbit where the space article is detached. In one feature, the rendezvous vehicle and locomotive vehicle use a common propellant and the space article is a satellite.

20 Claims, 8 Drawing Sheets

(56) References Cited

U.S. PATENT DOCUMENTS

| | | | |
|---|---|---|---|
| 9,850,008 B2 | 12/2017 | Zegler | |
| 10,543,939 B2* | 1/2020 | Kaplan | B64G 1/242 |
| 10,850,869 B2* | 12/2020 | Nicholson | B64G 1/1078 |
| 2003/0029969 A1* | 2/2003 | Turner | B64G 1/242 |
| | | | 244/158.9 |
| 2005/0067534 A1* | 3/2005 | Anderman | B64G 1/007 |
| | | | 244/172.4 |
| 2006/0278765 A1 | 12/2006 | Strack et al. | |
| 2015/0008288 A1 | 1/2015 | Bigelow | |
| 2015/0016560 A1 | 1/2015 | Kotecha | |
| 2015/0053823 A1* | 2/2015 | Bigelow | B64G 1/402 |
| | | | 244/172.4 |
| 2021/0061494 A1* | 3/2021 | Belieres Montero | B64G 4/00 |
| 2021/0122502 A1* | 4/2021 | Kokorich | B64G 1/1085 |

OTHER PUBLICATIONS

International Searching Authority, International Search Report and Written Opinion dated Nov. 19, 2020 in PCT/US2020/045316.
Pappalardo, How does the International Space Station dodge space junk? Air & Space Magazine, Mar. 1, 2007.

\* cited by examiner

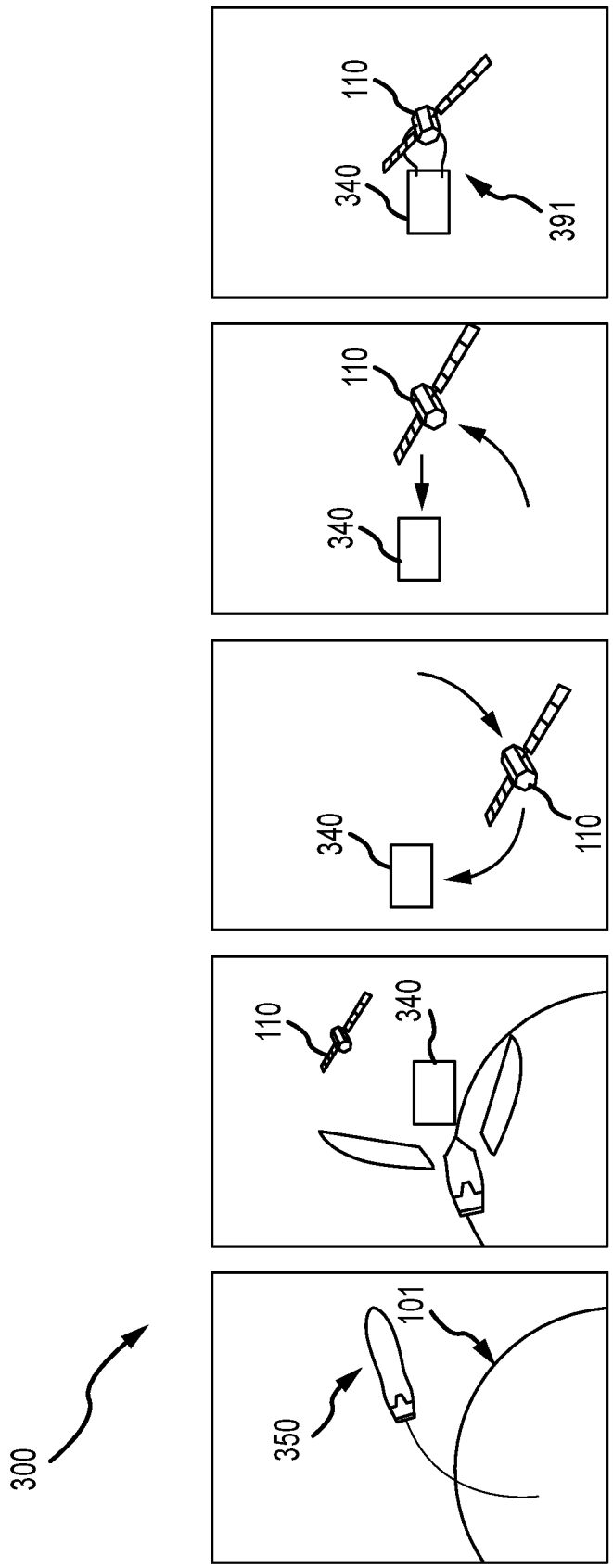

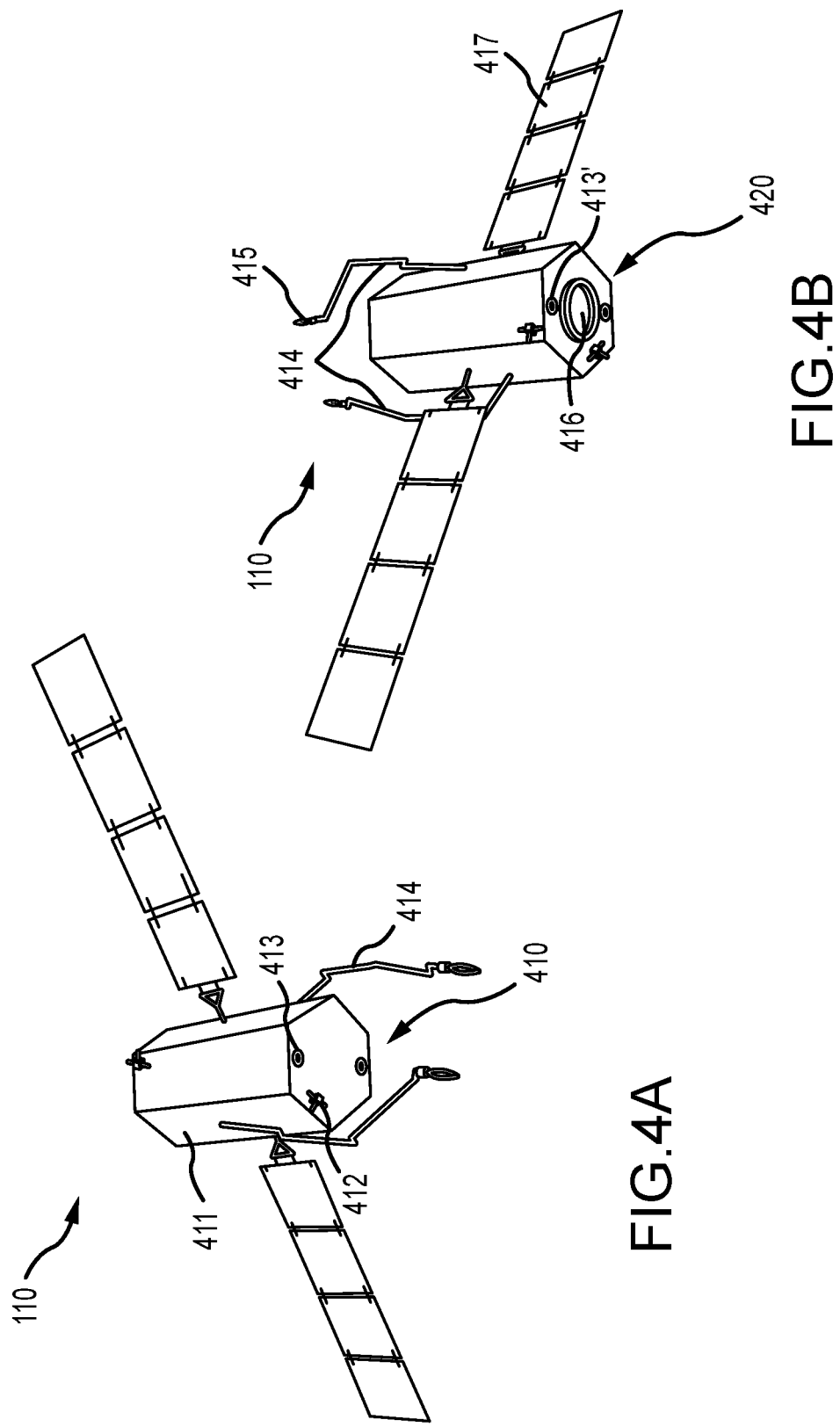

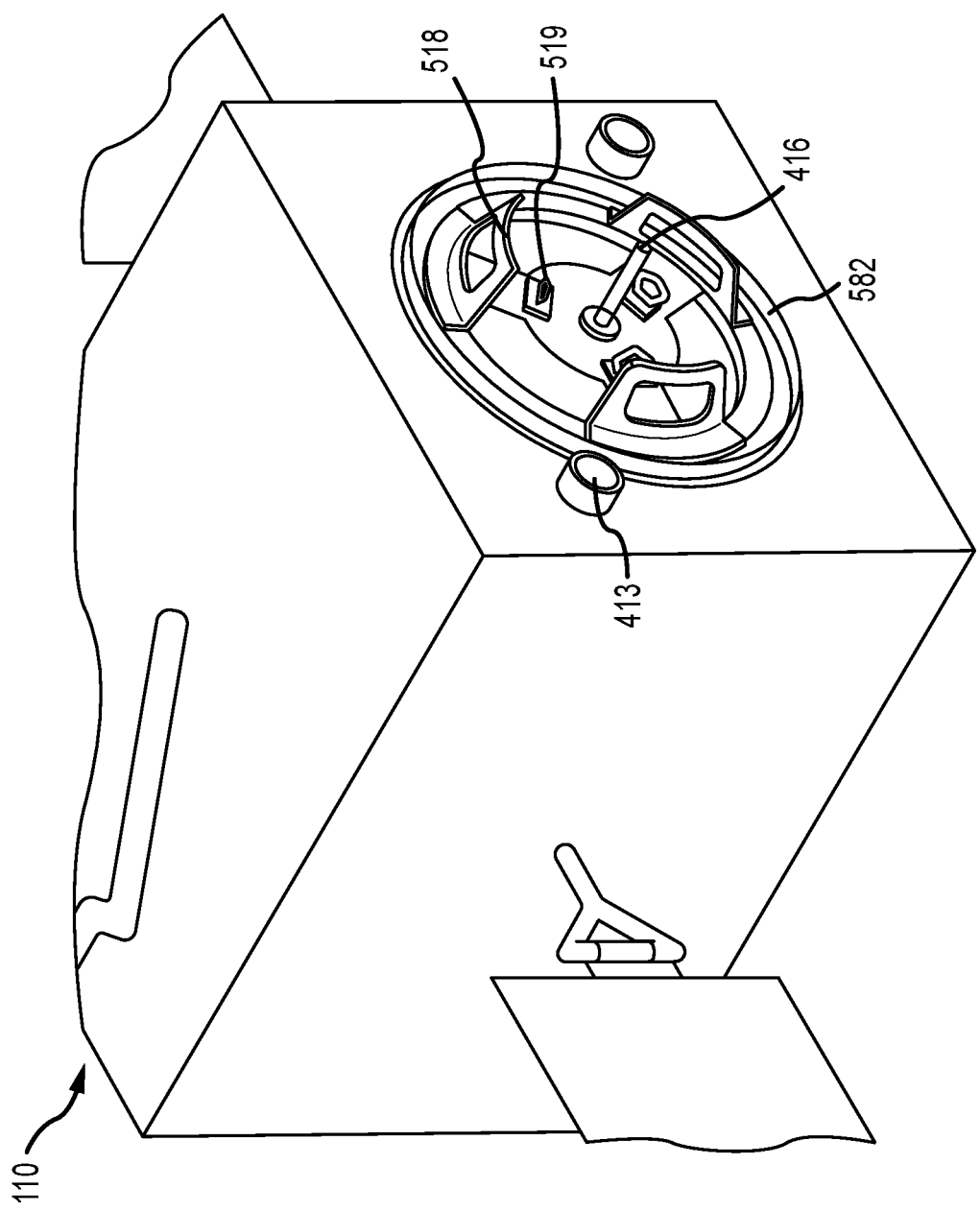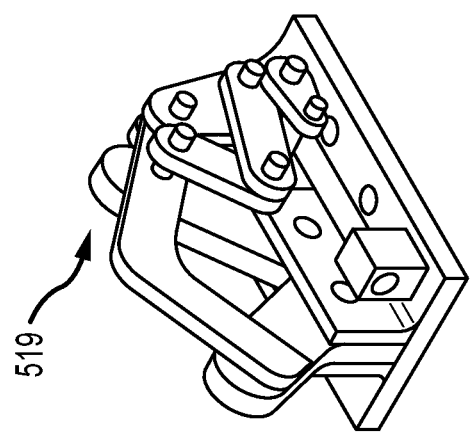
FIG.5A
FIG.5B

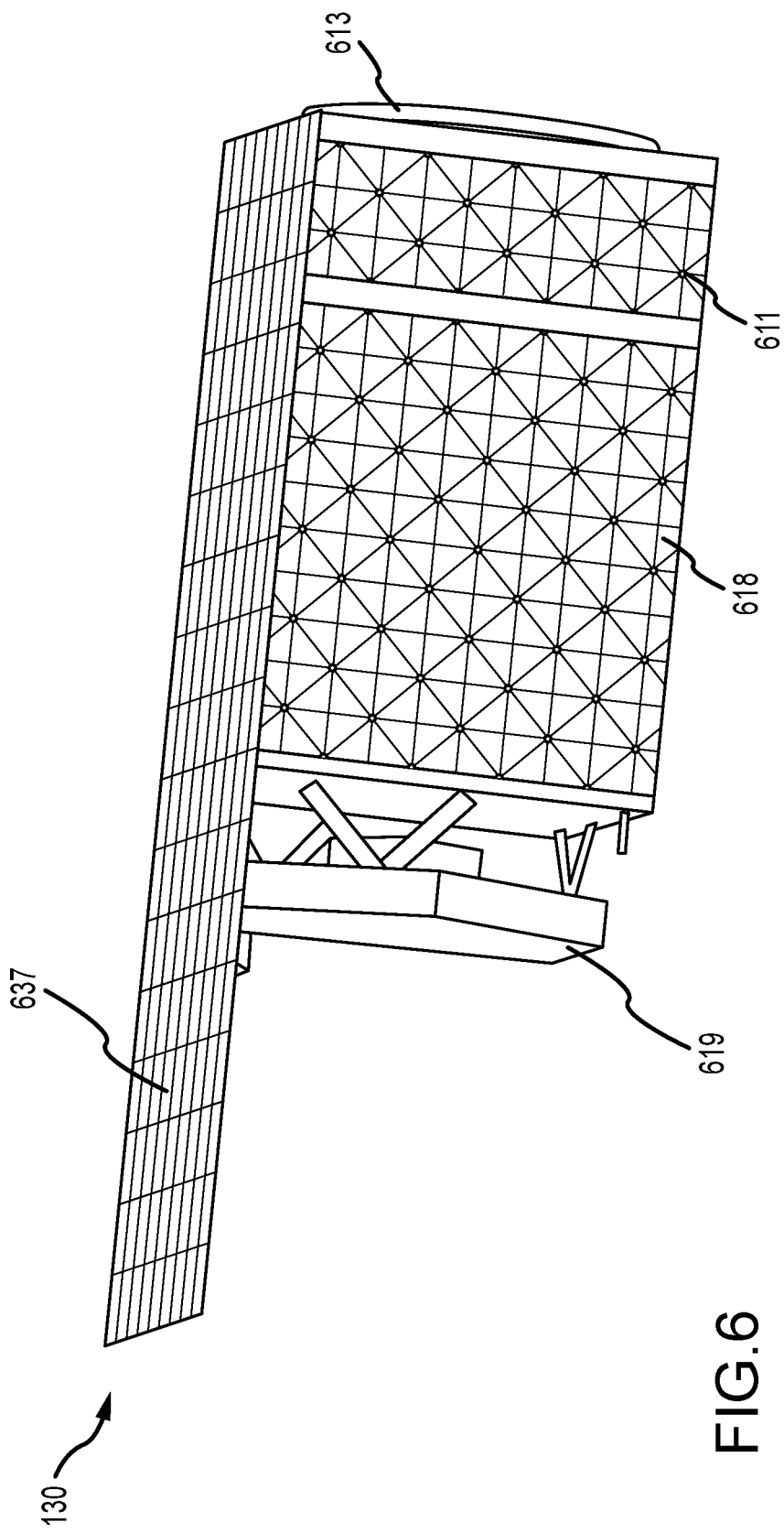

FIG. 8A (800)

| | RV + Dispenser | RV + Client | RV + Locomotive |
|---|---|---|---|
| Docked | X | | X |
| Berthed | | X | |
| Fluid Transfer | X | | X |

| | RV | RV + Dispenser | RV + Client | RV + Locomotive | Locomotive + RV + Dispenser | Locomotive + RV + Client |
|---|---|---|---|---|---|---|
| Precision Maneuvers | X | X | X | | | |
| Large Orbit Changes | | | | X | X | X |
| Docked | | X | | X | X | X |
| Berthed | | | X | | | X |

(860, 870)

MULTI-ORBITAL TRANSFER VEHICLE CONSTELLATION AND METHOD OF USE

CROSS-REFERENCE TO RELATED APPLICATIONS

This application is a nonprovisional patent application of and claims the benefit of U.S. Provisional Patent Application Nos. 62/884,604, filed Aug. 8, 2019 and titled "HIGH THRUST ELECTRIC SPACE TUG AND METHOD OF USE," and 62/886,867, filed Aug. 14, 2019 and titled "ALL-ELECTRIC INTEGRATED PROPELLANT SYSTEM AND METHOD OF USE," the disclosures of which are hereby incorporated herein by reference in entirety.

FIELD

The disclosure relates generally to systems and methods of use of an orbital transfer system, and more specifically to modular and scalable systems and methods to transfer space articles between space orbits.

BACKGROUND

Access to space through rocket launch is a bottle neck for schedule, volume, mass, and cost. In-space transportation systems (e.g. Orbital Transfer Vehicles (OTVs), dedicated "space tugs" that reside on-orbit) extend the capabilities of smaller launchers and allow for broad use of launch vehicle rideshare. Furthermore, use of such in-space transportation systems allow propellant, tankage, and propulsion equipment to reside in space so that more launch mass and volume can be dedicated to payload. This is a notable advantage over existing spacecraft propulsion systems, launch dispensers, and Expendable Launch Vehicle Secondary Payload Adapters (ESPA), which are launched with payloads.

Reusability of in-space transportation systems is compelling for cost-reduction as single-use systems have higher recurring build costs and higher cumulative launch costs. Reusability is enabled by two key features of an OTV or OTV constellation; an OTV's ability to rendezvous with new space objects or satellite client, and ability of an OTV to be refueled. The disclosed orbital transfer system, aka the disclosed OTV constellation, allows ubiquitous rendezvous with new satellite clients (e.g. client satellites) through a unique split architecture. In one embodiment, the orbital transfer system uses ammonia propellant as the single commodity consumed through OTV operation, thereby simplifying refueling operations and allowing reuse of the OTVs involved, as described in U.S. Pat. Appl. No. 62/886,867, incorporated by reference in entirety for all purposes. In one embodiment, the orbital transfer system uses electric propulsion, as described in U.S. Pat. Appl. No. 62/884,604, incorporated by reference in entirety for all purposes.

The disclosed orbital transfer system is particularly valuable to serve commercial satellite operators moving from low Earth orbit (LEO) to other valuable operational orbits, such as geostationary Earth orbit (GEO). Generally, the disclosed orbital transfer system provides a smart Rendezvous Vehicle (RV) (rendezvous and docking (RPO) "in-a-box") to attach to a client space article (e.g. a client satellite) before mating with a Locomotive Vehicle (LV) which provides primary propulsion. In one embodiment, the RV attaches to a dispenser, the dispenser carrying or otherwise coupled to the client space article, such as a client CubeSat. Such a "split architecture" for the disclosed orbital transfer system allows, among other things, a broader mission envelope without modifying operations with the client article.

The disclosed orbital transfer system may serve to transfer space articles between any number of orbits, to include initial client insertion orbit to a targeted client orbit, such as a geostationary (GEO) orbit, a geosynchronous earth orbit (GSO), a low-inclination low Earth orbit (LEO), or a highly elliptical orbit.

In order to comply with 35 U.S.C. Section 112 requirements and to more deeply describe aspects of the disclosure, the following are incorporated by reference in entirety for all purposes: U.S. Pat. Nos. 7,624,950; 4,187,506; 5,685,505; 4,078,747; 9,850,008; 5,282,357; 6,135,393; and 9,038,957; US Pat. Publ. Nos. 2015/0008288; 2015/0053823; and 2015/0016560; and U.S. Pat. Appl. No. 62/754,325; Canadian Pat. No. 2,831,309 and European Patent Application No. 2,740,668.

SUMMARY

A modular and scalable system to transfer space articles between space orbits is provided. In one embodiment, the system employs a rendezvous vehicle which docks with a space article in an initial orbit to form a connected stack, the connected stack then docking with a locomotive vehicle which maneuvers to a targeted orbit where the space article is detached. In one feature, the rendezvous vehicle and locomotive vehicle use a common propellant and the space article is a satellite. In one embodiment, the rendezvous vehicle attaches to a dispenser, the dispenser carrying or otherwise coupled to the client space article. In one embodiment, the dispenser is configured to provide propellant to the rendezvous vehicle, and the rendezvous vehicle in turn is configured to provide the dispenser-provided propellant to the locomotive vehicle. In one feature, each of the rendezvous vehicle, the dispenser, and the locomotive vehicle share a common propellant, such as ammonia.

In one embodiment, an orbital transfer system is disclosed, the system comprising: a rendezvous vehicle operating in a first orbit and adapted to engage a space article, the space article comprising a client space article and operating in a client insertion orbit; a locomotive vehicle operating in a second orbit and adapted to receive the rendezvous vehicle, the locomotive vehicle comprising a locomotive propulsion system; wherein: the rendezvous vehicle maneuvers from the first orbit to the client insertion orbit and engages the space article to form a first stack formed of the rendezvous vehicle and the client space article; the first stack maneuvers to dock with the locomotive to form a second stack formed of the rendezvous vehicle, client space article, and the locomotive vehicle; the locomotive propulsion system operates to maneuver the second stack to a client target orbit; and the client space article detaches from the second stack to operate in the client target orbit.

In one aspect, the rendezvous vehicle comprises a rendezvous propulsion system capable of performing precision maneuvers, rendezvous, and proximity maneuvers. In another aspect, each of the rendezvous propulsion system and the locomotive propulsion system operate with an ammonia propellant. In another aspect, the client space article is a satellite. In another aspect, the space article further comprises a dispenser. In another aspect, the dispenser comprises a dispenser-stored propellant. In another aspect, the rendezvous vehicle docks with the dispenser. In another aspect, at least some of the dispenser propellant is transferred to the rendezvous vehicle, the dispenser propellant an ammonia propellant. In another aspect, the first orbit is substantially the same as the second orbit. In another aspect, the rendezvous vehicle comprises a set of alignment petals used to dock with the locomotive.

In another embodiment, a method of orbital transfer is disclosed, the method comprising: providing a rendezvous vehicle operating in a first orbit, the rendezvous vehicle having a rendezvous vehicle propulsion system and adapted to engage a space article, the space article comprising a client space article and operating in a client insertion orbit; providing a locomotive vehicle operating in a second orbit, the locomotive vehicle adapted to engage the rendezvous vehicle, the locomotive vehicle comprising a locomotive propulsion system; maneuvering the rendezvous vehicle from the first orbit to the client insertion orbit; docking the rendezvous vehicle with the space article to form a first stack formed of the rendezvous vehicle and the client space article; engaging the rendezvous space article stack with the locomotive to form a second stack formed of the rendezvous vehicle, client space article, and the locomotive vehicle; activating the locomotive propulsion system to maneuver the second stack to a client target orbit; and detaching the client space article from the second stack; wherein: the client object operates in the client target orbit.

In one aspect, after detaching the client space article from the second stack, the rendezvous vehicle and the locomotive maneuver to the second orbit. In another aspect, the space article further comprises a dispenser, the dispenser forming a docked connection with the rendezvous vehicle as part of the first stack. In another aspect, the dispenser comprises dispenser-stored propellant, at least some of the dispenser propellant transferred to the rendezvous vehicle. In another aspect, the dispenser propellant is ammonia. In another aspect, the dispenser is undocked from the rendezvous vehicle after the client space article is detached. In another aspect, the rendezvous vehicle is configured to transfer dispenser-stored propellant received from the dispenser to the locomotive. In another aspect, the target orbit is a geosynchronous orbit. In another aspect, the rendezvous vehicle comprises a plurality of docking interfaces to enable simultaneous docking with a plurality of space articles.

In yet another embodiment, a method of orbital transfer is disclosed, the method comprising: providing a rendezvous vehicle operating in a staging orbit, the rendezvous vehicle having a rendezvous propulsion system and adapted to engage a space article, the space article comprising a client space article and operating in a rendezvous orbit; providing a locomotive vehicle operating in a staging orbit, the locomotive vehicle docked with the rendezvous vehicle, the locomotive vehicle comprising a locomotive propulsion system; undocking the rendezvous vehicle from the locomotive vehicle; maneuvering the rendezvous vehicle, using the rendezvous propulsion system, from the staging orbit to the rendezvous orbit; docking the rendezvous vehicle with the space article to form a first stack formed of the rendezvous vehicle and the client space article; maneuvering the first stack, using the rendezvous propulsion system, from the rendezvous orbit to the staging orbit; engaging the rendezvous space article stack with the locomotive to form a second stack formed of the rendezvous vehicle, client space article, and the locomotive vehicle; activating the locomotive propulsion system to maneuver the second stack to a client target orbit; and detaching the client space article from the second stack; wherein: each of the rendezvous propulsion system and the locomotive propulsion system operate with an ammonia propellant; and the client object operates in the client target orbit.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C. Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

Various embodiments or portions of methods of manufacture may also or alternatively be implemented partially in software and/or firmware, e.g. analysis of signs. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The disclosure will be readily understood by the following detailed description in conjunction with the accompanying drawings, wherein like reference numerals designate like elements. The elements of the drawings are not necessarily to scale relative to each other. Identical reference numerals have been used, where possible, to designate identical features that are common to the figures.

FIG. 3A is a representation of a first configuration of a sequence of configurations and operations of the rendezvous vehicle engaging a client space article;

FIG. 3B is a representation of a second configuration of a sequence of configurations and operations of the rendezvous vehicle engaging a client space article;

FIG. 3C is a representation of a third configuration of a sequence of configurations and operations of the rendezvous vehicle engaging a client space article;

FIG. 3D is a representation of a fourth configuration of a sequence of configurations and operations of the rendezvous vehicle engaging a client space article;

FIG. 3E is a representation of a fifth configuration of a sequence of configurations and operations of the rendezvous vehicle engaging a client space article;

FIG. 4A is a perspective view of a representation of one embodiment of the rendezvous vehicle of the orbital transfer system;

FIG. 4B is another perspective view of the representation of one embodiment of the rendezvous vehicle of FIG. 4A;

FIG. 5A is a close-up perspective view of a representation of one embodiment of a portion of the rendezvous vehicle of FIG. 4A;

FIG. 5B is a close-up perspective view of a representation of one embodiment of a bear-claw element of the portion of the rendezvous vehicle of FIG. 5A;

FIG. 6 is a perspective view of a representation of one embodiment of the dispenser of the orbital transfer system;

FIG. 8A is a table of orbital transfer system interfaces, presenting rows of interfaces of an orbital transfer system with respect to columns of configurations; and FIG. 8B is a table of orbital transfer system capabilities, presenting rows of capabilities of an orbital transfer system with respect to columns of configurations.

DETAILED DESCRIPTION

Reference will now be made in detail to representative embodiments. The following descriptions are not intended to limit the embodiments to one preferred embodiment. To the contrary, it is intended to cover alternatives, modifications, and equivalents as can be included within the spirit and scope of the described embodiments as defined, for example, by the appended claims.

Generally, an orbital transfer system operates to transfer space articles between space orbits. The system employs a rendezvous vehicle which docks with a space article in an initial orbit, the connected stack then docking with a locomotive vehicle which maneuvers to a targeted orbit wherein the space article is detached. The rendezvous vehicle may attach to a dispenser, the dispenser carrying or otherwise coupled to the client space article. The dispenser may be configured to provide propellant to the rendezvous vehicle, and the rendezvous vehicle in turn may be configured to provide the dispenser-provided propellant to the locomotive vehicle.

The term "propellant" means a substance used by a propulsion system to enable propulsion, such as by providing a reaction mass to a propulsion system. In one embodiment, the propellant is used by systems or components in addition to those of a propulsion system, such as by a thermal management system.

The rendezvous vehicle (RV) may be a small, solar-electric propulsion (SEP) OTV capable of docking or berthing with any payload. While able to act independently, the RV pairs with the locomotive to achieve larger orbit changes with heavier payloads. In this fashion, the RV is the utility vehicle for precision maneuvering, rendezvous and proximity operations (RPO), docking (or berthing), and deployment while a locomotive provides primary propulsion. To simplify cooperative operations and refueling, both vehicles may share an expendable propellant—ammonia. To avoid customer spacecraft modification, the RV attaches to standard spacecraft interfaces. The RV may also dock and attach to a dispenser to carry small customer satellites or propellant tanks for refueling the RV and/or locomotive.

Figure 1:
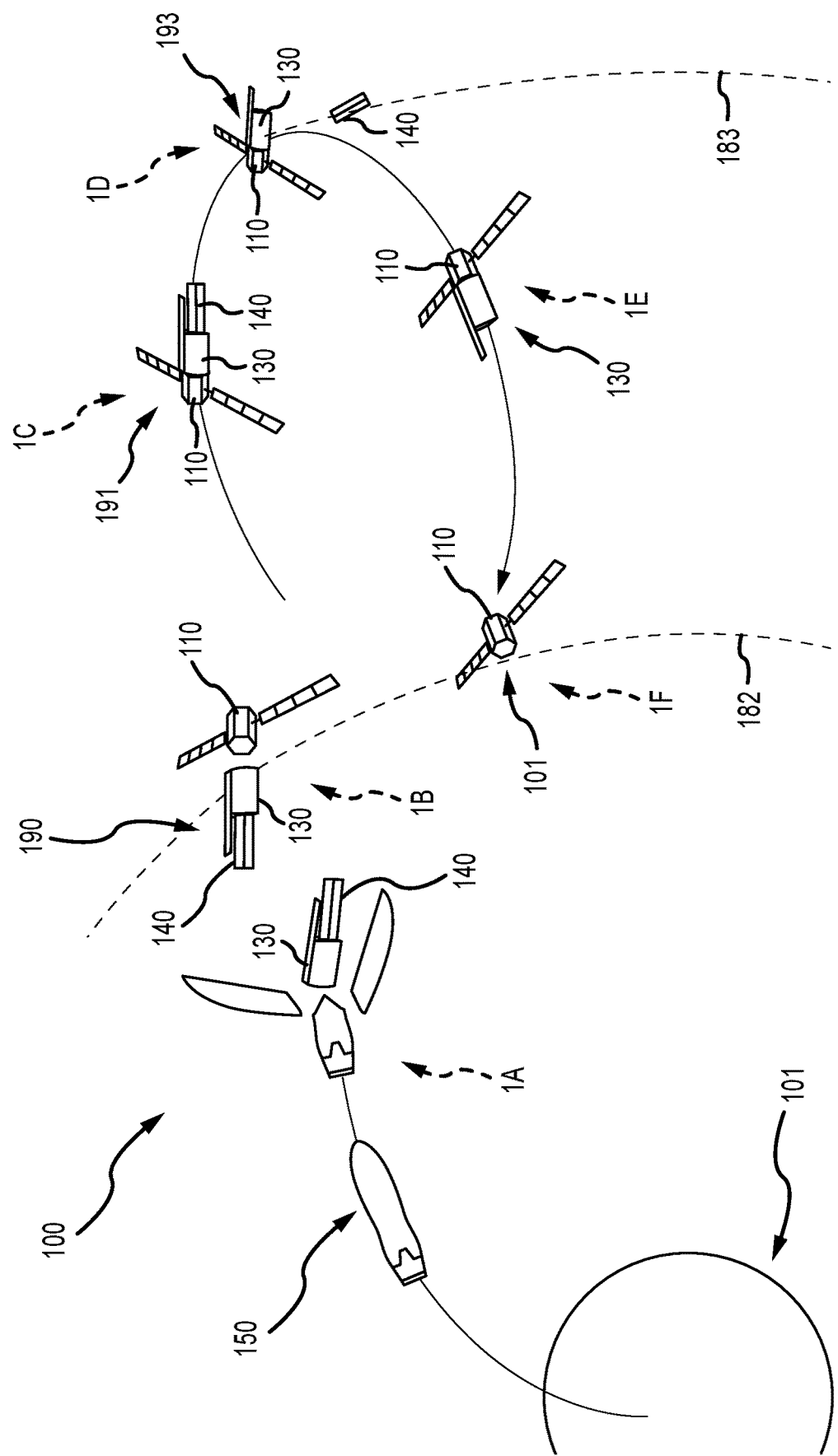
FIG. 1 is a representation of a sequence of configurations and operations of one embodiment of an orbital transfer system of the disclosure.
Figure 2:
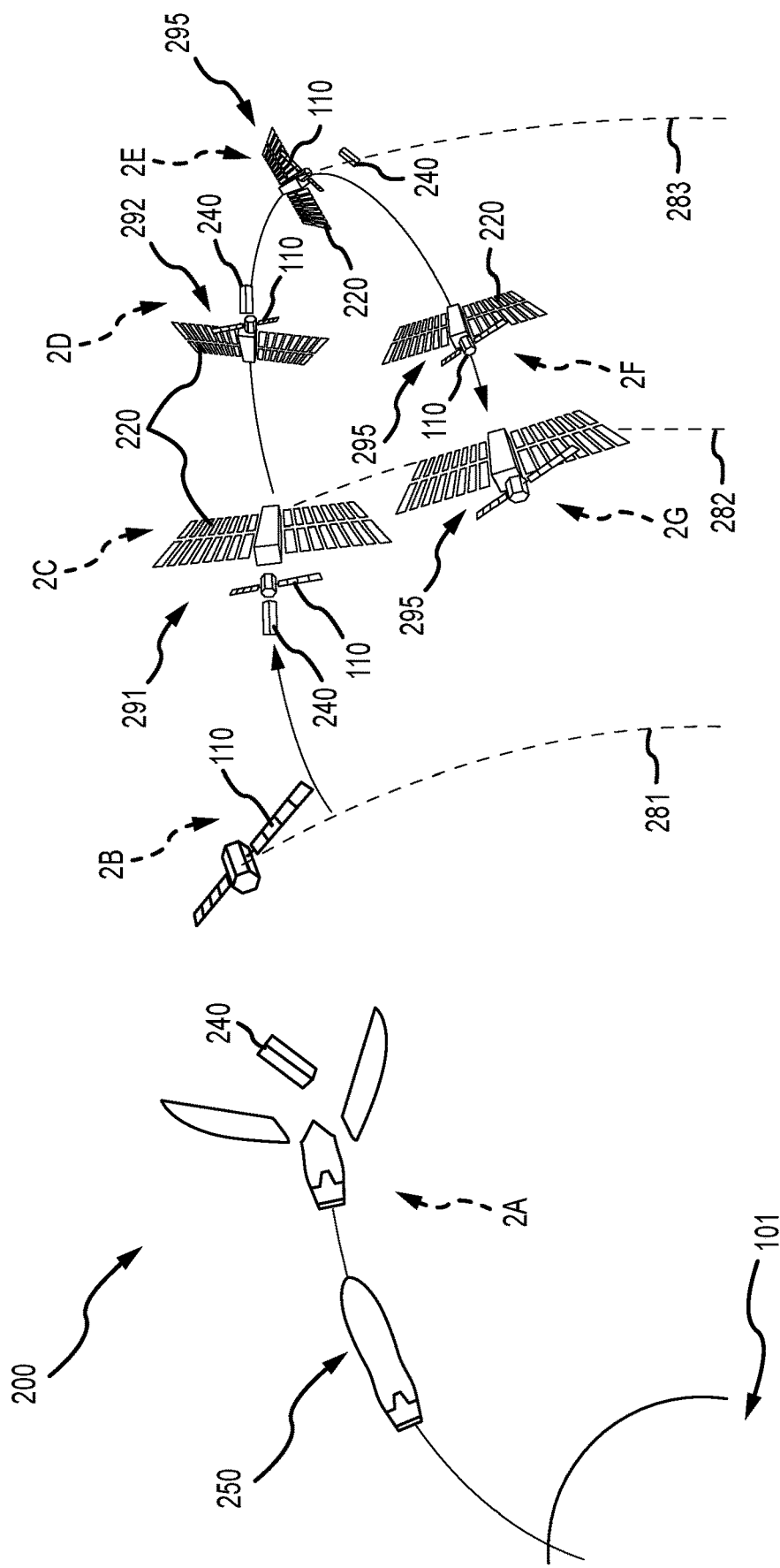
FIG. 2 is a representation of a sequence of configurations and operations of another embodiment of the orbital transfer system of the disclosure.

The disclosed devices, systems, and methods of use will be described with reference to FIGS. 1-8. FIGS. 1-3 provide representations of sequences of configurations and operations of the disclosed orbital transfer system (also referred to as "transfer system" or "system") and methods of use of the orbital transfer system (also referred to as "transfer method" or "method"). FIGS. 4-7 provide additional details of components of the disclosed orbital transfer system. FIG. 8 provides tables describing interfaces and capabilities of the disclosed orbital transfer system.

With attention to FIG. 1, a representation of a sequence of configurations and operations of one embodiment of an orbital transfer system 100 is presented. The orbital transfer system 100 orbits around Earth 101. The sequence of configurations and operations are identified on FIG. 1 as a set of six states 1A, 1B, 1C, 1D, 1E, and 1F which proceed in such order, meaning after state 1A, the system operates to proceed to state 1B, etc. The system 100 operates to move a client space article from a client insertion orbit to a client target orbit 183.

The orbital transfer system 100 comprises rendezvous vehicle (RV) 110 and dispenser 130. The dispenser 130 is engaged with the client space object 140. In one embodiment, the client space object 140 is a client satellite. In one embodiment, the dispenser 130 is docked with the client space object 140.

The term "engage" and the phrase "engaged with" means to be connected with or to connect with, to include, for example, docking with and/or berthing with. The term "dock" and the phrase "docking with" mean to join two separate free-flying space objects, typically including latching or otherwise coupling the two objects by way of a docking connector. A "soft docking" is a docking that does not form a rigid connection between the space objects; a "hard docking" forms a rigid connection between the space objects and may also form an airtight seal between the space objects. The term "berthing" and the phrase "berthing with" means to rigidly join two separate free-flying space objects by way of one or more robotic arms.

At state 1A, a mated or combined or joined set of dispenser 130 and client space object 140 (collectively the dispenser-client stack 190) are separated form launch vehicle 150 and placed into a notional orbit. Note that payloads are typically launched as individual targets or consolidated and launched in the dispenser 130 carrier. The dispenser 130 may also be launched with propellant, allowing refueling of the RV and locomotive.

The notional orbit of the dispenser-client stack 190 may be a client insertion orbit (analogous to FIG. 3B discussed below, wherein a client satellite 340, after separation from launch vehicle 350, operates in a client insertion orbit below or less than an orbit of an approaching RV 110). The client insertion orbit may be a low-Earth Orbit (LEO.) One or both of the dispenser 130 and client space object 140 of the dispenser-client stack 190 may then undergo system check-out to, e.g., ensure operation and safety of one or more systems. In one embodiment, the client insertion orbit of the dispenser-client stack 190 may be substantially the same as the RV staging orbit 181. In one embodiment, the client insertion orbit of the dispenser-client stack 190 may be within several km of the RV staging orbit 182. The RV staging orbit 182 may be referred to as a first orbit.

At state 1B, the RV maneuvers from RV staging orbit 182 to the dispenser-client stack 190, the dispenser-client stack 190 operating in a client insertion orbit and/or operating in an orbit substantially the same as the RV staging orbit 182. After the RV 110 maneuvers to the dispenser-client stack 190, the RV 110 engages with the dispenser-client stack 190. In one embodiment, the RV 110 docks with the dispenser 130, the dispenser 130 engaged with the client space object 140. The RV 110 as engaged with the dispenser-client stack 190 forms an expanded stack of space objects and may be referred to as a first stack 191. In one embodiment, the RV 110 receives propellant fuel from the dispenser 130.

At state 1C, the first stack 191 maneuvers to the client target orbit 183 with use of a rendezvous vehicle propulsion system. In one embodiment, the rendezvous vehicle propulsion system operates with the propellant provided by dispenser 130 in state 1B. At state 1D, the client space object 140 is detached from the dispenser 130 so as to operate in the client target orbit 183. The RV 110 remains engaged with the dispenser 130 to form stack 193. At state 1E, the combined RV 110 and dispenser 130 maneuver from the target orbit 183 to the RV staging orbit 181.

At state 1F, the combined RV 110 and dispenser 130 arrive at the RV staging orbit 181 and the dispenser 130 in disengaged from or detaches from the RV 110. In one embodiment, the dispenser 110 is disengaged or is detached from the RV 110 at other than the RV staging orbit 181, e.g. at an orbit above or below the RV staging orbit 181. In one embodiment, the dispenser 110 is deorbited after detaching or disengaged from the RV 110. In one embodiment, the RV staging orbit 181 is a LEO.

Note that although the system 100 of FIG. 1 is depicted operating with a client space object 140 engaged with a dispenser 130, the system 100 may also operate without the dispenser 130. In such an embodiment, the RV 110 would engage, such as berth, with the client space object 140 rather than with the dispenser 130, yet still maneuver to the client target orbit 183 wherein the client space object 140 would be released so as to operate in the client target orbit 183.

Generally, the RV 110 is capable of limited repositioning or maneuvering of a client object (to include a client satellite object) and/or a client object engaged with a dispenser 130 to alternate orbits, as described with respect to FIG. 1. In order to reposition or maneuver a client object, to include a client object engaged with a dispenser 130 and a client object that is a client satellite), a locomotive vehicle 220 may be employed.

With attention to FIG. 2, a representation of a sequence of configurations and operations of anther embodiment of an orbital transfer system 200 is presented. The orbital transfer system 200 orbits around Earth 101. The sequence of configurations and operations are identified on FIG. 2 as a set of seven states 2A, 2B, 2C, 2D, 2E, 2F, and 2G. The seven states proceed in such order, meaning after state 2A, the system 200 operates to proceed to state 2B, etc. The system 200 operates to move a client space article from a client insertion orbit to a client target orbit 283.

The orbital transfer system 200 is similar to orbital transfer system 100 yet further comprises locomotive vehicle 220 (also referred to as locomotive 220) in addition to rendezvous vehicle (RV) 110 yet does not include dispenser 130. (In an alternate embodiment, the system 200 does comprise a dispenser 130, the dispenser 130 engaged with a client space object 140 in the manner described above with respect to system 100 and FIG. 1.) The system 200, like that of system 100, operates to place a client space object 240 into a target orbit 283. In one embodiment, the client space object 240 is a client satellite.

At state 2A, the client space object 240 is separated form launch vehicle 250 and placed into a notional orbit. The notional orbit of the client space object 240 may be a client insertion orbit (analogous to FIG. 3B discussed below, wherein a client satellite 340, after separation from launch vehicle 350, operates in a client insertion orbit below or less than an orbit of an approaching RV 110). The client insertion orbit may be a LEO. The client space object 240 may then undergo system check-out to, e.g., ensure operation and safety of one or more systems. In one embodiment, the client insertion orbit of the client space object 240 may be substantially the same as the RV and locomotive staging orbit 282. In one embodiment, the client insertion orbit of the client space object 240 may be substantially the same as the RV rendezvous orbit 281. In one embodiment, the client insertion orbit of the client space object 240 may be within several km of the RV and locomotive staging orbit 282. In one embodiment, the client insertion orbit of the client space object 240 is the same as the RV rendezvous orbit 281.

In the embodiment of the system 200 depicted in FIG. 2 (at state 2C), the RV 110 and the locomotive vehicle 220 nominally operate at a common orbit: the RV and locomotive staging orbit 282. Note that RVs and locomotives will nominally reside mated together in staging orbits in low Earth orbit (LEO). The staging orbits are optimized for specific launch sites such as 400 km circular LEO at an inclination of 28°. In other embodiments, the RV 110 and the locomotive vehicle 220 nominally operate at different orbits: the nominal RV 110 operating orbit may be referred to as a first orbit, the nominal locomotive vehicle 220 operating orbit may be referred to a second orbit.

At state 2B, the RV 110 maneuvers to RV rendezvous orbit 281. The RV 110 maneuvers to the client space object 240 wherein the RV 110 engages with the client space object 240. In one embodiment, the RV 110 captures or berths with the client space object 240.

The RV 110 as engaged with the client space object 240 forms an expanded stack of space objects and may be referred to as a first stack 291.

At state 2C, the first stack 291 maneuvers to the RV and locomotive staging orbit 282 with use of a rendezvous vehicle propulsion system and engages with the locomotive vehicle 220. The first stack (that is, the stack of the RV 110 engaged with the client space object 240), when engaged with the locomotive vehicle 220, forms an expanded stack of space objects and may be referred to as a second stack 292. In one embodiment, the RV 110 docks with the locomotive vehicle 220.

At state 2D, the second stack 292 maneuvers to the client target orbit 283 with use of a locomotive vehicle propulsion system. The second stack 292, while in transit to the target orbit, must make requisite inclination changes. Transfer durations are strongly dependent on payload mass and initial conditions and the locomotive selected for the operation.

In one embodiment, the locomotive vehicle propulsion system operates with the propellant provided by RV 110. (In an embodiment in which a dispenser 130 is employed, the locomotive vehicle propulsion system operates with the propellant provided by dispenser 130). At state 2E, the client space object 240 is detached from the second stack 292 so as to operate in the client target orbit 283. The RV 110 remains engaged with the locomotive 220 to form stack 295. At state 1F, the combined RV 110 and locomotive 220 maneuver from the target orbit 283 to the RV and locomotive staging orbit 282, depicted as state 2G. (In embodiments of system 200 in which a dispenser 130 is employed. The dispenser 130 is detached at state 1F). In one embodiment, the RV and locomotive staging orbit 282 is a LEO. In one embodiment, the RV 110 and locomotive 220 remain engaged or coupled or docked while operating in the RV and locomotive staging orbit 282. In one embodiment, the RV 110 and locomotive 220 detach or decouple or undock while operating in the RV and locomotive staging orbit 282.

FIGS. 3A-E depict a sequence of precise maneuvers of the RV 110 when approaching and engaging with a client space object 340. In the subsystem 300 of FIGS. 3A-E, the rendezvous vehicle 110 is shown approaching and berthing with a client satellite 340. The sequence and description of the RV 110 approaching and engaging with client space object 340 of FIGS. 3A-E may be used in the state 2B of FIG. 2 and the state 1B of FIG. 1.

At state 3A, launch vehicle 350 comprising a client space object 340 is launched from Earth 101. At state 3B, the client space object 340 enters a notional orbit. The notional orbit of the client space object 340 may be a client insertion orbit. The client insertion orbit is below or less than an orbit of an approaching RV 110. In one embodiment, the notional orbit of the client space object 340 is at least 5 km from the orbit of RV 110. In one embodiment, the notional orbit of the client space object 340 is at least 10 km from the orbit of RV 110.

At state 3C, the RV 110 performs an initial approach and acquires the client space object 340 by way of one or more sensors of the RV 110.

At state 3D, the RV 110 performs a close approach, maneuvering (in one embodiment) at no more than 0.1 m/s when operating at or within 100 m of the client space object 340 and no more than 0.05 m/s when operating at or within 20 m from the client space object 340. At state 3E, the RV 110 captures or engages or berths with the client space object 340.

The systems, features, and methods of systems 100 and 200 may be combined such that steps are added, deleted, or modified. In order to complement the above description of FIGS. 1-3, the following narrative of system operations is provided.

For the rendezvous phase of a particular mission, the combined locomotive/RV stack may place itself into a safe orbit well above the launch vehicle separation orbit while awaiting launch, in-plane with the planned launch orbit. Once the client space article (aka the "Client") has been successfully launched, a rendezvous profile may be computed that allows the locomotive to place itself into a co-elliptic orbit above and behind the Client on the v-bar (velocity direction) and the locomotive may maintain this relative orbit altitude using Client tracking data continuously to ensure safe relative orbital dynamics when the vehicles are in close proximity.

When the locomotive has successfully placed itself into the desired phasing relationship with the Client (e.g. a client satellite), the RV undocks from the locomotive and will begin the capture phase of the rendezvous.

The RV may transfer to an orbit below and co-elliptic with the Client, ensuring that the RV's orbit still has >24 hours safe free drift at all times during this transfer. Then the RV will slowly phase forward until it is able to acquire the Client in its rendezvous sensors (FIG. 3C). At this point, the RV will transfer to an orbit close below and co-elliptic with the Client orbit. Once an acceptable phasing relationship is reached in this orbit, the RV will transfer to a location directly behind the Client and will hold that relative position until released to capture the Client (FIG. 3D).

At this point, the RV will begin to approach the Client vehicle for the final berthing or docking operation, depending on the capture profile for the Client. The approach is performed using the primary electric thruster, attitude control thrusters, differential drag, or a combination thereof. The RV will initiate a closing speed of 0.1 m/s in Client-centric LVLH (local-vertical, local horizontal) coordinates and will approach to a relative position of ~20 m to the desired capture mechanism. At this point, the RV will transition to its mechanism-relative capture coordinates, ~20 m back from the capture location in a frame relative to the mechanism. Once this geometry-transfer is complete, the RV will again approach the target, this time with a closure rate of 0.05 m/s until it reaches either docking contact, or desired berthing standoff location. If docking, the RV will free-drift until the docking process is complete and if berthing, the RV will hold the standoff until the Client is captured and will then free-drift (FIG. 3E). Following rigidization of the mated stack, the RV will capture vehicle rates and begin the process of approaching the locomotive.

The return of the mated RV and Client to the locomotive is essentially the same approach as used for Client capture. Once the mated stack is fully safe, either the RV will capture the remaining attitude rates if necessary or the locomotive will absorb the rate change using its own control system.

For this system, it is assumed that all of the Client satellites will be cooperative targets and will be able to place their contact hardware pointing "behind" or "in-front" them in their orbit-relative frame. If a different orientation for final-approach is desired for a particular mission, that may be satisfied, but a single final-approach profile does need to be selected to accommodate system development and testing. All Client satellites must be able to hold their attitude in an orbit-relative frame continuously once they are acquired by the RV's rendezvous sensors. In one embodiment, such an attitude must be accurate to within approximately 0.5 degrees at all times and within approximately 0.05 degrees/second in attitude rate once the final-approach phase is initiated. Once contact is initiated, the Client attitude control system may be disabled (that is, the Client needs to be commanded into free drift) as soon as possible to avoid imparting too much momentum to that system, either via ground-command or based on observed telemetry. This command can be sent by operators on the ground. No intervehicle communications are required.

The rendezvous vehicle, an agile, dedicated RPO vehicle, may provide multiple hundreds of thousands of seconds of impulse using its electric ammonia-fed thruster. The RV performs attitude control through a combination of reaction wheels, torque rods, and multiple (up to 24) ammonia cold-gas thrusters, with the latter also used during RPO. This robust attitude control system (ACS) provides control authority even when the RV is docked or berthed to heavy payloads, for example the heaviest client object up to 10,000 kg. All thrusters (including cold-gas) may use ammonia, which is storable, self-pressurizing, and low cost—xenon, a common propellant for electric propulsion is over 100× the cost of ammonia. Ammonia is an ideal commodity for cost-effective operations. The ammonia may be stored in two tanks, exceeding 100 kg in capacity. No pressurant gas or other commodity is necessary for propellant storage and management, as described in 62/886,867.

The RV 110 may have two docking interfaces located on opposing sides of the vehicle's body (fore- and aft). These docking interfaces facilitate rigid connections when multiple OTV constellation vehicles need to dock together, per the systems 100 and 200. Stated another way, the fore- and aft-docking interfaces of the RV allow configurations with multiple simultaneous docked payloads and vehicles. The docking mechanisms are peripheral and utilize "alignment petals". These petals allow for a relatively large amount of axial misalignment which cannot be tolerated by other systems. In effect, mis-aligned spacecraft within the enlarged alignment tolerance envelope, make contact at one point, petal to petal, and further translational closure of the gap between the two craft causes other petals to contact one another, sliding into a position where the contact constraints of the mating petals forces near-perfect alignment. This increased misalignment tolerance is most readily evident about the chaser-spacecraft roll axis, but translates into lesser, but significant, misalignment tolerance gains about the pitch and yaw axes of the chaser spacecraft as well.

Systems using these petals include the NASA LIDS, the International Docking System Standard, and the Hubble Space Telescope Soft Capture System. These petals may be manufactured easily, are passive, relatively lightweight, and do not consume much volume. As such, these petals can be easily incorporated into every vehicle of the disclosure. In addition to the alignment petals, a rigid connection is made using a simple lead screw or linearly-actuated latch. These latches are peripheral to allow for greater rigidity. Each docking interface also contains two Propellant Transfer Valves (PTVs). These refueling ports are engaged when the RV is in a docked configuration with a dispenser or another system vehicle. Two of these PTVs, one fore, one aft, feed the main propellant storage tank. The two remaining PTVs are connected to each other and may be isolated from the main propellant feed and storage system. These ports facilitate flow in either direction and allow refueling directly from one docked spacecraft (e.g. a dispenser) to a second docked spacecraft (e.g. a locomotive) with no intermediary storage of the propellant on the RV.

The RV 110 may also possess two lightweight robotic arms and gripper assemblies perform soft capture and berthing of unmodified Clients. With 5-DoF (degrees-of-freedom) and a 1-1.5 m reach, the arms' range exceeds 180°. When used in conjunction, the two arms alleviate joint loading during operations when a heavy client space object is rigidly connected to a RV-locomotive stack. The arm end-effectors can capture and anchor to any diameter launch vehicle adapter (Marmon ring or lightband) or an exposed spacecraft structural member. The robotic arms with distal sensors also facilitate rendezvous and docking or berthing in either direction.

RV relative navigation packages which consist of visual cameras (near- and far-field), and LIDAR sensors, are mounted distally on the end-effector chassis to allow a mobile sensor package closer to the client space objects. It also provides the flexibility to perform docking or capture and berthing operations either forward or aft of the RV.

FIGS. 4A-B and 5A-B provide perspective views of one particular embodiment of the rendezvous vehicle 110 of the disclosed orbital transfer system, such as systems 100 and 200. The rendezvous vehicle 110 comprises a body 411, a first end 410 and a second end 420, the first end 410 generally facing opposite to the second end 420. The body 411 comprises a dedicated rendezvous computer and associated software. The first end 410 comprises one or more lightweight robotic arms 414, the one or more robotic arms may comprise a universal docking gripper 415 which itself may comprise a relative navigation package. The first end 410 may also comprise thrusters 412 which provide, among other things, maneuvering and attitude control. The thrusters 412 may be ammonia cold-gas thrusters. In one embodiment, the thrusters 412 are 24 in number and the robotic arms are 2 in number. In one embodiment, attitude control is augmented with one or more of reaction wheels and torque rods. The first end 412 may further comprise a docking and refueling interface 413, which in one embodiment is 4 in number. One second end 420, the RV 110 comprises another docketing and refueling interface 413' and an RV thruster 416 (aka the RV propulsion system referenced above). In one embodiment, the RV thruster 416 is an ammonia electric thruster used for orbit transfers. In one embodiment, the total refueling interfaces 413 and 413' are four in number. Gimbaled solar arrays 413 attach to body 411 and, in one embodiment, are two in number.

In one embodiment, the RV 110 may have a mass no more than 200 kg, have approximate power of 400 We, have a lifetime of approximately five years, and employ ammonia resistojet propulsion.

With attention to FIGS. 5A-B, perspective close-ups are provided of components of the RV 110. FIG. 5A shows the second end 420 comprising two docking and refueling interfaces 413' (aka propellant transfer valves), a set of three docking (alignment) petals 518, a primary thruster 416, a set of three bear claw latches 519, and the passive side of docking interface 582 (e.g. a 24" lightband). In one embodiment, the components fitted to the second end 420 form a peripheral docking system that is similar in concept to the Hubble Space Telescope Soft Capture Mechanism.

FIG. 5B depicts one of the three bear claw latches 519. In one embodiment, each bear claw latch is actuated and/or effectuated by way of a lead-screw and/or a laser/photodiode latch trip switch, comprises a volt/ammeter on latch power leads, allows for considerable misalignment, and weighs approximately 0.3 kg each.

The dispenser is a robust multi-mission payload dispenser and refueling tanker. The dispenser is deployed in LEO or an intermediate orbit (e.g. GTO). The dispenser provides a standard docking interface for the RV that enables direct capture and subsequent transport with no additional launch vehicle adapter requirements on smaller Clients. Space-X rideshare and ESPA-compatible, the dispenser fits in small launchers with a standard 15" lightband. Its separate payload section can carry up to 48 U of CubeSats or 100 kg of ammonia propellant. The dispenser can also be scaled up for larger refueling missions. At end-of-life, the dispenser is placed in a low disposal orbit by the RV and uses a passive deorbit device, if required.

As a disposable, single-use vehicle, the dispenser is low cost and simple. dispensers contain the following key features: ammonia propellant storage system; minimum one docking interface that contains alignment petals; two bi-directional PTVs (if carrying propellant); and typical spacecraft systems (including but not limited to power systems, structures, thermal control systems, communications, command and data handling, guidance navigation and control) for limited independent operation.

Note that refueling can be performed from any OTV to any other OTV to which it is directly mated or connected to through the RV. Heat energy is used to facilitate the transfer to simplify the system and reduce complex fluid components. The process for refueling in this manner is to first dock the two OTVs together (or three if the RV is allowing flow-through between two OTVs). Then the fuel tanks will be connected, and pressure will be allowed to equalize. The dispensing OTV's fuel tank will be heated, raising the temperature and pressure and induce a flow of fuel from one tank to the other. In one embodiment, flow-through refueling is provided for redundancy and to facilitate rapid refueling of locomotive from a large dispenser. Also, in one embodiment, thermal differential refueling is employed to simplify propellant storage and transfer systems.

FIG. 6 provides a perspective view of one particular embodiment of the dispenser 130 of the orbital transfer system, such as system 100. The dispenser 130 comprises a body 611 with body-mounted solar array 637, high technology readiness level subsystems and components 611, a payload deck 619, and at least one docking and refueling interface 613. In some embodiments, the dispenser 130 has two docking and refueling interfaces 613. In the embodiment depicted, the dispenser 130 has a 24U capacity; in other embodiments, the dispenser may have a 48U capacity. In one embodiment, the payload deck 637 may engage a 50 kg small satellite. In one embodiment, the dispenser 130 weighs up to 200 kg and has a lifetime of approximately 12 months.

Locomotives serve the purpose of increasing the capacity, range, or speed of the RV. Locomotives are not able to independently rendezvous or capture client space articles or other spacecraft and can only serve OTV missions in conjunction with the RV, such as described with respect to FIG. 2. Locomotives may contain the following features: capable propulsion system utilizing ammonia propellant; ammonia propellant storage system; minimum one docking interface that contains alignment petals, and two bi-directional PTVs; and typical spacecraft systems (including but not limited to power systems, structures, thermal control systems, communications, command and data handling, guidance navigation and control) for limited independent operation. The ammonia propulsion system can utilize an electrothermal thruster (such as a resistojet or Arcjet), a plasma thruster (such as a magnetohydrodynamic (MPD) thruster), nuclear thermal thruster, or a combination therefore, as described in U.S. Pat Appl. Nos. 62/884,604 and 62/886,867.

Figure 7A:
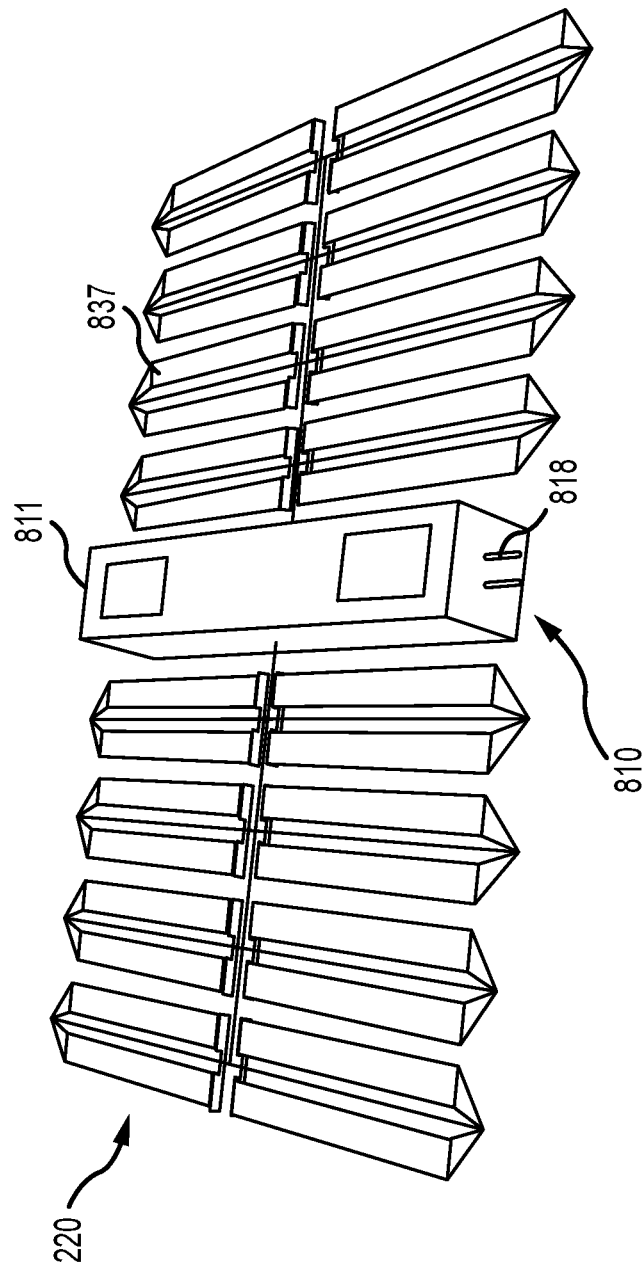
FIG. 7A is a perspective view of a representation of one embodiment of the locomotive vehicle of the orbital transfer system.
Figure 7B:
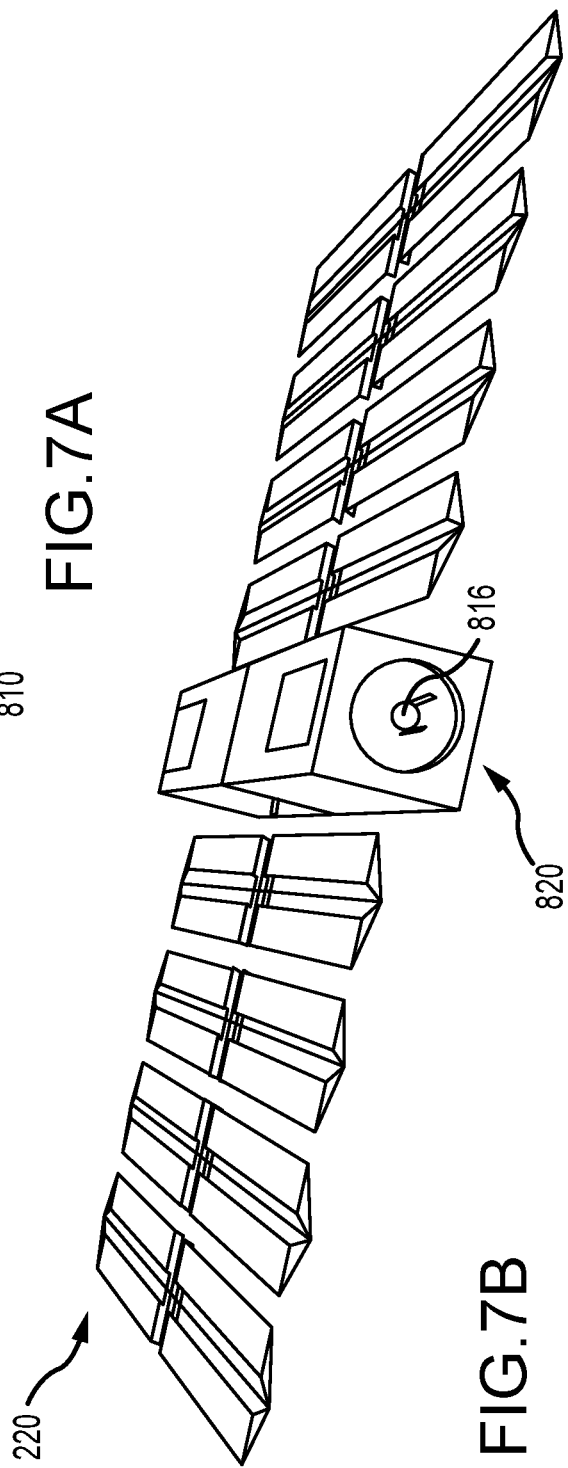
FIG. 7B is another perspective view of the representation of one embodiment of the locomotive vehicle of FIG. 7A.

FIGS. 7A-B provide a perspective view of one particular embodiment of the locomotive vehicle 220 (aka the "locomotive" 220) of the orbital transfer system, such as system 200. The locomotive vehicle 220 comprises a body 811 with first end 810 and second end 820. The body 811 comprises next-generation solid state power storage, avionics, and command and data handling (C&DH) and guidance, navigation, and control (GN&C) capabilities. A set of state-of-the art solar array blankets attach to the body 811, the solar array comprising P-type solar cells on a flexible blanket. In one embodiment, the solar array blankets are sixteen in number. The body 811 may also contain lightweight ammonia tanks, lightweight structure, deployables, and provide array containment.

The first end 810 comprises one or more docking and refueling interfaces 818. In one embodiment, the docking and refueling interface may comprises two or more PTVs. The second end 820 comprises a locomotive propulsion system 816, such as an ammonia Arcjet thruster or ammonia MPD thruster. In one embodiment, the ammonia thruster operates at 600-2,000s Isp.

In one embodiment, the locomotive may produce power at or exceeding 20 kWe and have a lifetime of approximately ten years.

In one embodiment a common ammonia propellant is used on all Orbital Transfer Vehicles of the disclosed system for all propulsive and propellant conditioning needs, such as the locomotive and the RV.

FIGS. 8A-B provide tables describing interfaces and capabilities of the disclosed orbital transfer system. FIG. 8A is a table 800 of orbital transfer system interfaces, presenting rows 810 of interfaces of an orbital transfer system with respect to columns 820 of configurations. FIG. 8B is a table 850 of orbital transfer system capabilities, presenting rows 860 of capabilities of an orbital transfer system with respect to columns 870 of configurations.

In one embodiment, one or more of the propulsion systems comprise electric propulsion systems and/or pulsed propulsion systems, such as those described in U.S. Pat. Appl. No. 62/886,867, incorporated by reference in entirety for all purposes.

Note that the disclosed systems and architecture does not require the operation of refueling depots and assumes that required propellant may be launched with the client space object. However, the disclosed architecture is fully compatible with depots. More frequent refueling of the OTVs will reduce transit times for the client space object.

The architecture of the disclosed systems provide many advantages over conventional architectures, to include, e.g., refueling independent of operating on-orbit fuel depots; a high level of flexibility provided through splitting RPO and primary locomotion into two vehicles; and the ability to transport any unmodified, cooperative client (aka client space article). The disclosed system initially refuels by launching propellant with the Client. While on-orbit depots are optimal, and more frequent refueling reduces client transit times, depending on such platforms adds execution risk until they are operational. The ability to refuel by either method reduces risk. Another advantage of the disclosed system is the RV is the only active participant in all RPO, docking and berthing operations. This alleviates stiffness and attitude control requirements of the locomotive, reducing structural mass (saving propellant consumption) and attitude control system cost. A separate locomotive allows scaling to different systems for varied mission needs without RPO redesign. This allows seamless transition to different locomotive variants, which may be designed to maximum fuel efficiency, capacity, or speed. Since the RV can dock with any disclosed vehicle, it can move from one locomotive to another without disrupting the payload.

The exemplary systems and methods of this disclosure have been described in relation to systems and methods of use of an orbital transfer system to transfer space objects between locations, such as between orbits. However, to avoid unnecessarily obscuring the present disclosure, the preceding description omits a number of known structures and devices, and other application and embodiments. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the methods have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein.

In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An orbital transfer system comprising:
a rendezvous vehicle operating in a first orbit and adapted to engage a space article, the space article comprising a client space article and operating in a client insertion orbit;
a locomotive vehicle operating in a second orbit and adapted to receive the rendezvous vehicle, the locomotive vehicle comprising a locomotive propulsion system;
wherein:
the rendezvous vehicle being configured to maneuver from the first orbit to the client insertion orbit and engaging the space article to form a first stack formed of the rendezvous vehicle and the client space article;
the rendezvous vehicle being further configured to maneuver the first stack to dock with the locomotive vehicle to form a second stack formed of the rendezvous vehicle, client space article, and the locomotive vehicle;
the locomotive propulsion system being configured to maneuver the second stack to a client target orbit; and
the rendezvous vehicle and the locomotive vehicle being configured to release the client space article from the second stack to enable the client space article to operate in the client target orbit.

2. The system of claim 1, wherein the rendezvous vehicle comprises a rendezvous propulsion system capable of performing precision maneuvers, rendezvous, and proximity maneuvers.

3. The system of claim 2, wherein each of the rendezvous propulsion system and the locomotive propulsion system is configured to operate with an ammonia propellant.

4. The system of claim 1, wherein the space article is a satellite.

5. The system of claim 1, wherein the space article further comprises a dispenser.

6. The system of claim 5, wherein the dispenser comprises a dispenser-stored propellant.

7. The system of claim 6, wherein the rendezvous vehicle is configured to dock with the dispenser.

8. The system of claim 7, wherein the rendezvous vehicle is configured for receiving at least some of the dispenser-stored propellant when docked with the dispenser, the dispenser-stored propellant including an ammonia propellant.

9. The system of claim 1, wherein the first orbit is substantially the same as the second orbit.

10. The system of claim 1, wherein the rendezvous vehicle comprises a set of alignment petals used to dock with the locomotive.

11. A method of orbital transfer comprising:
providing a rendezvous vehicle operating in a first orbit, the rendezvous vehicle having a rendezvous vehicle propulsion system and adapted to engage a space article, the space article comprising a client space article and operating in a client insertion orbit;
providing a locomotive vehicle operating in a second orbit, the locomotive vehicle adapted to engage the rendezvous vehicle, the locomotive vehicle comprising a locomotive propulsion system;
maneuvering the rendezvous vehicle from the first orbit to the client insertion orbit;
docking the rendezvous vehicle with the space article to form a first stack formed of the rendezvous vehicle and the client space article;
engaging the first stack with the locomotive to form a second stack formed of the rendezvous vehicle, the client space article, and the locomotive vehicle;
activating the locomotive propulsion system to maneuver the second stack to a client target orbit; and
detaching the client space article from the second stack to enable
the client space article to operate in the client target orbit.

12. The method of claim 11 further comprising, after detaching the client space article from the second stack, maneuvering the rendezvous vehicle and the locomotive vehicle to the second orbit.

13. The method of claim 11, wherein the space article further comprises a dispenser, the dispenser forming a docked connection with the rendezvous vehicle as part of the first stack.

14. The method of claim 13, wherein the dispenser comprises dispenser-stored propellant, and the method further comprising transferring at least some of the dispenser-stored propellant to the rendezvous vehicle.

15. The method of claim 14, wherein the dispenser-stored propellant is ammonia.

16. The method of claim 15 further comprising undocking the dispenser from the rendezvous vehicle after the client space article is detached.

17. The method of claim 14, wherein the rendezvous vehicle is configured to transfer dispenser-stored propellant received from the dispenser to the locomotive.

18. The method of claim 11, wherein the target orbit is a geosynchronous orbit.

19. The method of claim 11, wherein the rendezvous vehicle comprises a plurality of docking interfaces to enable simultaneous docking with a plurality of space articles.

20. A method of orbital transfer comprising:
providing a rendezvous vehicle operating in a staging orbit, the rendezvous vehicle having a rendezvous propulsion system and adapted to engage a space article, the space article comprising a client space article and operating in a rendezvous orbit;
providing a locomotive vehicle operating in the staging orbit, the locomotive vehicle being docked with the rendezvous vehicle, the locomotive vehicle comprising a locomotive propulsion system;
undocking the rendezvous vehicle from the locomotive vehicle;
maneuvering the rendezvous vehicle, using the rendezvous propulsion system, from the staging orbit to the rendezvous orbit;
docking the rendezvous vehicle with the space article to form a first stack formed of the rendezvous vehicle and the client space article;
maneuvering the first stack, using the rendezvous propulsion system, from the rendezvous orbit to the staging orbit;
engaging the first stack with the locomotive vehicle to form a second stack formed of the rendezvous vehicle, the client space article, and the locomotive vehicle;
activating the locomotive propulsion system to maneuver the second stack to a client target orbit; and
detaching the client space article from the second stack; wherein:
each of the rendezvous propulsion system and the locomotive propulsion system operates with an ammonia propellant; and
the client space article operates in the client target orbit.

* * * * *